June 16, 1959     F. D. BOWEN ET AL     2,890,712

SAFETY GAS VALVES

Filed Oct. 8, 1953

INVENTORS
Frederick D. Bowen
Gleeson B. Bowen

BY *Lancaster, Allwine and Rommel*

ATTORNEYS

United States Patent Office 2,890,712
Patented June 16, 1959

2,890,712
SAFETY GAS VALVES

Frederick D. Bowen, Joplin, and Gleeson B. Bowen, Monett, Mo.

Application October 8, 1953, Serial No. 384,962

2 Claims. (Cl. 137—459)

This invention relates to valves and more particularly to safety gas valves adapted to be interposed in conduits to govern the flow of gas therethrough. It is an improvement upon a portion of the valve disclosed in U. S. Patent No. 1,119,060, dated December 1, 1914, and granted to Frederick D. Bowen and Samuel T. Clutter.

An important object of the invention is to provide a valve which is opened by pressure of the normal flow of gas through a conduit, in which the valve is interposed, and will remain open during such normal flow, but will close upon stoppage of the flow and remain closed, preventing the flow to an outlet of the conduit, until manually released from the closed position, even though the flow is resumed during the interval between stoppage and release, and which valve, when closed, will positively prevent the flow of gas to the outlet.

Another important object is to provide a valve of the described kind which is not apt to freeze nor stick during use.

A further object is to provide such a valve in which the parts thereof are readily assembled and are not difficult to construct.

Additionally, an important object is to provide a valve latch means, including an abutment which has an additional function.

Other objects and advantages of the invention will be apparent during the course of the following detailed description of the invention, taken in connection with the accompanying drawing, forming a part of this disclosure, and in which drawing.

Figure 1:
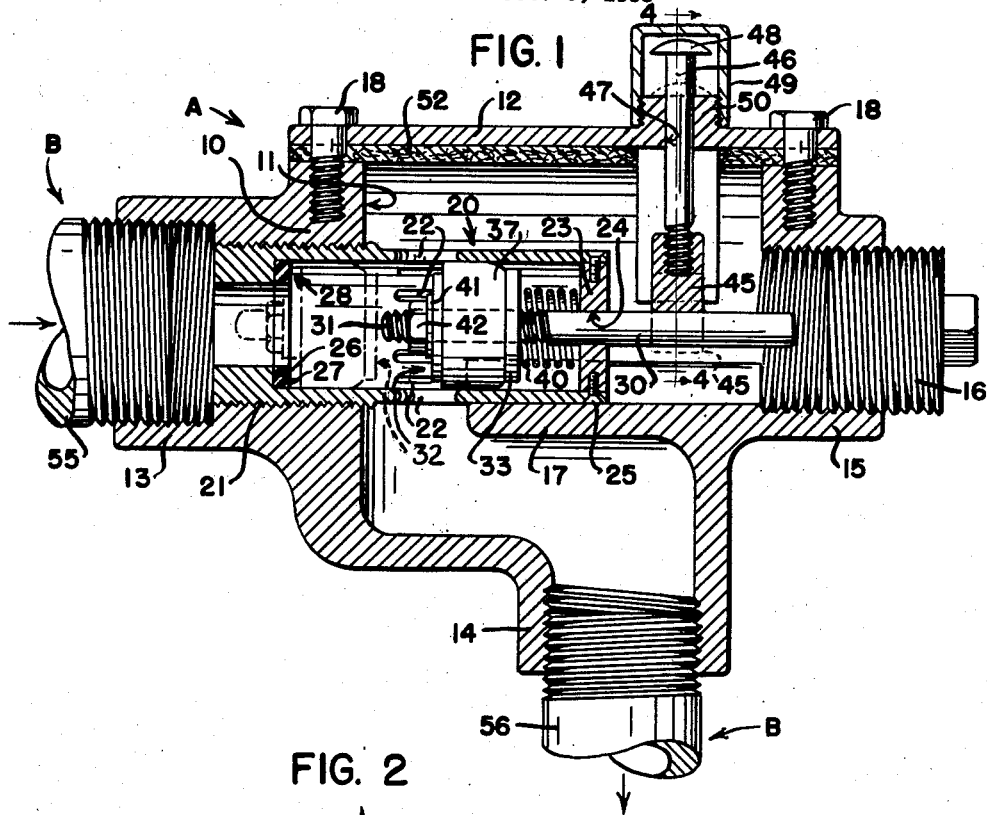
Fig. 1 is a vertical section of the valve, interposed in a conduit, with the valve shown open in full lines and closed in dot-and-dash lines.
Figure 2:
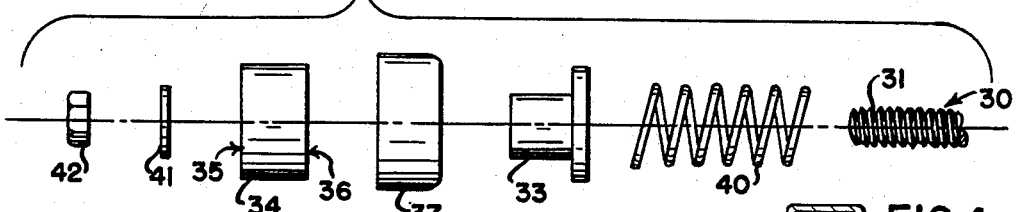
Fig. 2 is an exploded view of positions of the valve assembly.

In the drawing, wherein for the purpose of illustration is shown a preferred embodiment of the invention and wherein similar reference characters designate corresponding parts throughout the several views, the letter A designates the new valve of this invention and B a conduit in which the valve A is interposed.

The new valve A includes a housing 10 defining a valve chamber 11 closed by a suitable major removable closure or upper wall 12 of the housing and provided with two ports and defined by annular outwardly-extending flanges 13 and 14 respectively. An auxiliary opening to the chamber 11, defined by an outwardly-extending annular flange 15, is closed by a suitable closure 16. Furthermore, the chamber 11 is preferably provided with a transversely arcuate partition or wall 17, intermediate the closure 12 and port defined by the flange 14, and extending from the flange 15 substantially parallel with the path of reciprocation of the valve stem 30 (to be described) but spaced from this stem as is clear in Fig. 1. In the example shown, the axes of the flanges 13 and 14 form substantially a right angle, and the axes of the flanges 13 and 15 and valve stem 30 substantially coincide. The flanges 13, 14 and 15 are preferably interiorly screw-threaded, the closure 16 is preferably exteriorly screw-threaded to cooperate with the screw threads of the flange 15, and the closure 12 is provided with suitable closure fastener means, such as a plurality of screws 18 with their shanks extending through suitable openings in the closure 12 and into screw-threaded sockets in the wall of the housing 10.

It will be noted that the screw threads of the flange 13 are in two series, so that one series may accommodate the screw threads at the end of one section 55 of the conduit B and the other series, may accommodate the exterior screw threads 21 of a valve cage 20 to be next described.

The housing 10 houses a valve structure including a valve cage 20, which is preferably tubular, with exterior screw threads 21 at one end portion to cooperate with the second-named series of screw threads of the flange 13, and the cylindrical wall of the cage is provided, intermediate the ends of the cage, with a plurality of spaced apart openings 22 extending longitudinally thereof for the flow of gas from the cage. A valve stem guide means may be provided at the end portion of the cage opposite the first-named portion and may be a disc 23 with a central opening 24 for the valve stem 30. The disc may be held in place by suitable securing means, such as screws 25 with the shanks extending through suitable openings in the wall of the cage and into suitable screw-threaded radially-extending sockets in the disc and opening at its periphery. The cage is provided with an annular interiorly-disposed shoulder 26 adjacent the first-named end which, with a rubber ring 27 disposed upon the shoulder and in fixed contact therewith, provides a valve seat 28. The ring has a substantially flat face, providing a seating surface normal to the path of travel of the valve stem 30 and it functions additionally as a cushion for the valve head 32 to be subsequently described.

The valve stem 30 is horizontally disposed and is preferably a cylindrical rod, screw threaded at its inward end portion 31, and smooth surfaced otherwise, and its smooth-surfaced portion slides through the opening 24.

Mounted upon the stem 30, at the portion 31, is a valve head 32 which includes a rigid and preferably metallic member 33 comprising a tubular body portion, interiorly screw threaded, and an outwardly extending flange portion with the flange portion at the end of the tubular portion most remote from the seat 28. The screw threads of the member 33 cooperate with screw threads of the stem 30.

Figure 3:
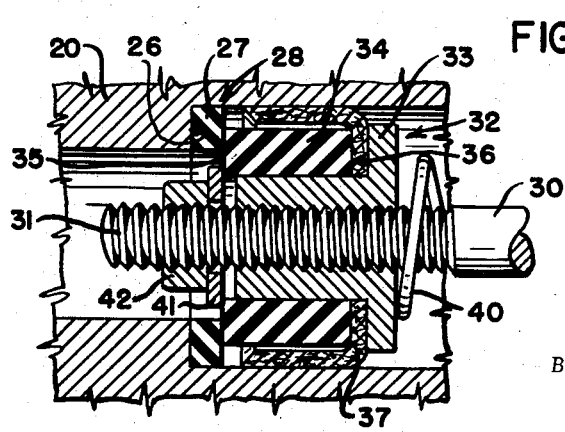
Fig. 3 is an enlarged fragmentary vertical section of the valve member of the valve in a seated position.
Figure 4:
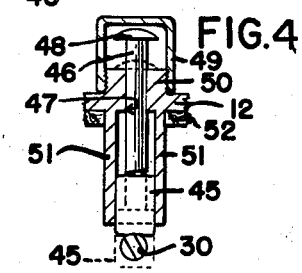
Fig. 4 is a vertical section substantially on the line 4—4 of Fig. 1.

A tubular rubber valve member 34 is mounted upon the tubular body portion of the member 33 and has an end face portion 35 of which a part (the outermost part) is adapted to contact the seat 28 at a portion of the flat face of the rubber ring 27. This contact is best shown in Fig. 3. The outer diameter of the member 34 is less than the inner diameter of the cage 20 so there is a space between the two.

Held wedged between the end face 36 of the tubular valve member 34 opposite the end face 35 and the adjacent face of the flange of the member 33 is a base or flange portion of a cupped member 37 of slightly flexible leather and with the mouth thereof facing the valve seat. The base portion is, of course, provided with an opening for mounting upon the valve stem and the outer face of the body portion of the cupped member is in sliding contact with the inner face of the wall of the cage 20, It will be noted, in Fig. 3, that the inner face of the body portion of the member 37 is spaced from the outer face of the tubular member 34 and the seat-engaging end portion of the latter extends beyond the adjacent edges of the members 33 and 37.

The member 37 is provided to center the member 34 so that it will seat evenly over a substantially like area about the rubber ring 27 of the valve seat 28, yet it will not be rigid, as would be a metal member. There will be very little wear upon the member 37 since it slides over the inner face of the cage only in the rare occasions when there is gas failure in the conduit B. It should be borne in mind that the member 37 is not simply a gasket, a piston, a packing nor even a valve body adapted to seat upon the seat 28, since it does not contact the seat at all (as is clear in Fig. 3). It is important that, when the valve seats, the head is in even contact with the seat to prevent the escape of gas when gas pressure is built up after a fall in pressure. However, while pressure is being built up, after a drop, and the valve is closed, in the event of any leakage of gas, due to the increased pressure, occurs between the valve seat and the member 34, the gas will flow into the space between the members 34 and 37 and force the free end portion of the member 37 outwardly to provide a seal against flow of gas beyond the valve head.

Urging the valve head 32 to seat when gas is below normal is an expansion helical spring 40 which extends about a portion of the stem 30 and bears, at one end, upon the adjacent end of the metallic member 33 and bears, at the other end, upon the adjacent face of the disc 23.

Retaining the valve head members in place are a washer 41 with the outermost portion of one face bearing against the adjacent face 35 of the tubular valve member 34 and bearing against one face of a nut 42 mounted upon the smooth-surfaced portion of the stem 30 as in Fig. 3.

The cupped member 37 being of leather and the cage of metal, there is less tendency of sticking and freezing of the former.

As latch means to retain the valve closed in the event pressure drops and the valve closes after which pressure is built up sufficiently to normally hold the valve open, we provide a gravity-actuated polygonal sliding abutment 45 adapted to rest, at its lower end face, upon the upper portion of the periphery of the smooth-surfaced portion of the stem 30 but which will drop into the path of reciprocation of the stem when the valve closes and remains in abutment with the end face of this smooth-surfaced portion until manually raised. In order to permit manual raising of the abutment 45 we provide the vertically-disposed rod 46 which is adapted to slide through a suitable opening 47 in the closure 12 and extend upwardly therefrom, being provided with an enlargement 48 at its free upper end. When in contact with the end face of the valve stem, the abutment provides additional means to prevent canting of the stem. This construction is believed an improvement upon the latch means disclosed in the patent referred to above.

To provide a removable closure in order to manually raise the rod 46, we prefer the interiorly screw threaded cap 49 to be screwed down upon the hollow boss or projection 50 which has screw threads to cooperate with those of the cap 49. In order to guide and retain the abutment 45 against accidental rotation, we provide a pair of spaced-apart slideways 51 extending from the closure or wall 12 of the bonnet into the valve chamber 12 and disposed to either side of the abutment 45 with flat faces of the abutment in sliding contact with the inner faces of the slideways. These abutments also tend to prevent accidental uncoupling of the abutment 45 and rod 46.

Preferably we provide a gasket 52 between the closure 12 and adjacent bonnet wall.

The conduit B is shown to comprise two sections 55 and 56 having screw threads at their end portions adapted for cooperation with the screwthreads of the flanges 13 and 14 respectively so that gas will flow through the conduit section 55, thence into the valve cage 20 and out through the openings 22 and conduit section 56.

With normal flow of gas pressure the valve will remain open but, upon a fall in the pressure, the valve will close, as is now apparent, and as the valve head 32 seats, the abutment will drop as stated.

The cage 20 is inserted, with its accompanying valve structure through the port in the flange 13. Pressure of the spring 40 may be increased or decreased by tightening or loosening the nut 42 and rotating the member 33 correspondingly.

By the term "slightly flexible leather" of the cupped member 37 is meant leather firm enough to retain the tubular rubber valve member 34 centered as stated yet will be flexible enough to grip the wall of the cage 20 when flexed by gas pressure.

Various changes may be made to the form of the invention herein shown and described without departing from the spirit of the invention or scope of the claims.

What is claimed is:

1. A one-seat gas valve, including a valve housing defining a valve chamber and provided with spaced-apart gas entry and exit ports and a valve seat disposed intermediate said ports, an elongated valve cage within the chamber, carried by the housing intermediate said ports and having an annular interiorly-disposed shoulder upon which said valve seat is mounted and a cylindrical side wall provided with a plurality of spaced-apart elongated openings extending longitudinally thereof and in direct communication with said exit port, and a valve head within the cage slidable toward and away from said ports and provided with a tubular member having a valve seat-engaging end face portion, said head including a cupped member opening toward said valve seat and having a body portion extending about the greater part of the outer periphery of said tubular member, said body portion being spaced from said tubular member and falling short of said end face portion and with the outer peripheral face of said body portion being in sliding contact with said valve cage and being of a length greater than the length of any of said openings and less than the length of said cage from said seat to the adjacent end of any of said openings, whereby said cupped member tends to center said end face portion upon said seat and provides, with the outer peripheral surface of said tubular member, a gas pocket to trap gas leaking from said entry port past said seat to said exit port when said valve is closed.

2. A one-seat gas valve, including a valve housing defining a valve chamber and provided with spaced-apart gas entry and exit ports and a valve seat disposed intermediate said ports, an elongated valve cage within the chamber, carried by the housing intermediate said ports and having an annular interiorly-disposed shoulder upon which said valve seat is mounted and a cylindrical side wall provided with a plurality of spaced-apart elongated openings extending longitudinally thereof and in direct communication with said exit port, and a valve head within the cage slidable toward and away from said ports and provided with a tubular portion, including an imperforate body and an outwardly extending flange portion at an end of said body most remote from said valve seat, a tubular member carried by said tubular body portion and having an imperforate body, an end face spaced from said flange portion and having a valve seat-engaging end portion opposite said end face, said head also including a cupped member opening toward said valve seat and having a body portion extending about the greater part of the outer periphery of said tubular member, said body portion of said cupped member being spaced from said tubular member and falling short of said end portion and being provided with an inwardly extending flange in tight engagement with said outwardly extending flange and said end face of said tubular member, and with the outer peripheral face of said body portion being in sliding contact with said valve cage and being of a length greater than the length of any of said openings and less than the length of said cage from said seat to the adjacent end of any of said openings, whereby said cupped member tends to center said end face portion upon said seat and provides, with the outer peripheral surface of said tubular member and a portion of said inwardly extending flange, a gas pocket to trap gas leaking from said entry port past said seat to said exit port when said valve is closed.

References Cited in the file of this patent

UNITED STATES PATENTS

| | | |
|---|---|---|
| 337,350 | Russell | Mar. 2, 1886 |
| 340,524 | Russell | Apr. 20, 1886 |
| 573,462 | Hawley | Dec. 12, 1896 |
| 682,689 | Heston | Sept. 17, 1901 |
| 1,097,095 | Henry | May 19, 1914 |
| 1,119,060 | Bowen | Dec. 1, 1914 |
| 1,304,409 | Thompson | May 20, 1919 |
| 2,191,162 | Schnell | Feb. 20, 1940 |